Aug. 25, 1953   E. M. TUCKER   2,649,920
CABLE DRIVE FOR AIRPLANES
Filed Oct. 29, 1951   2 Sheets-Sheet 1
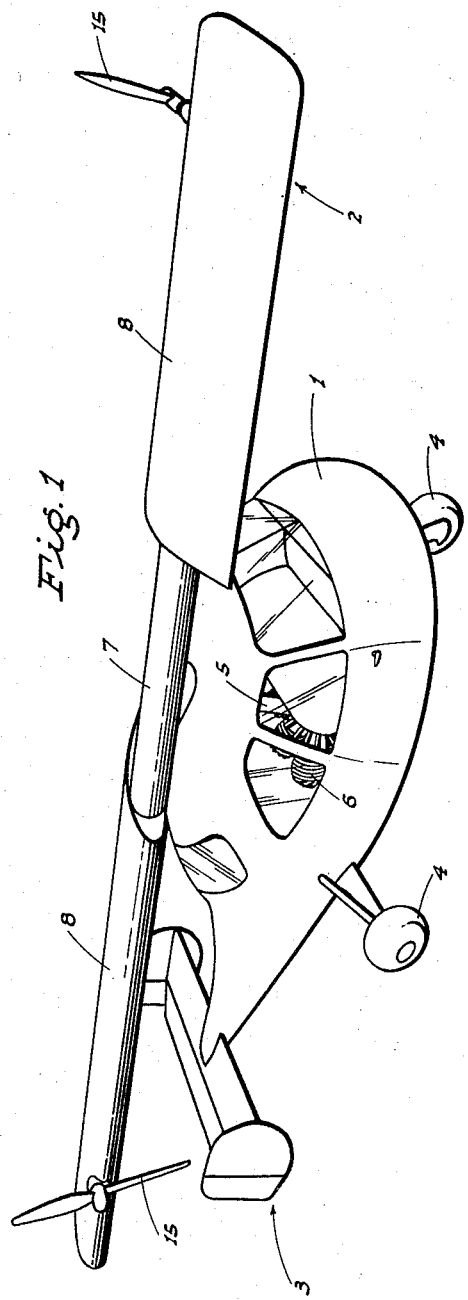
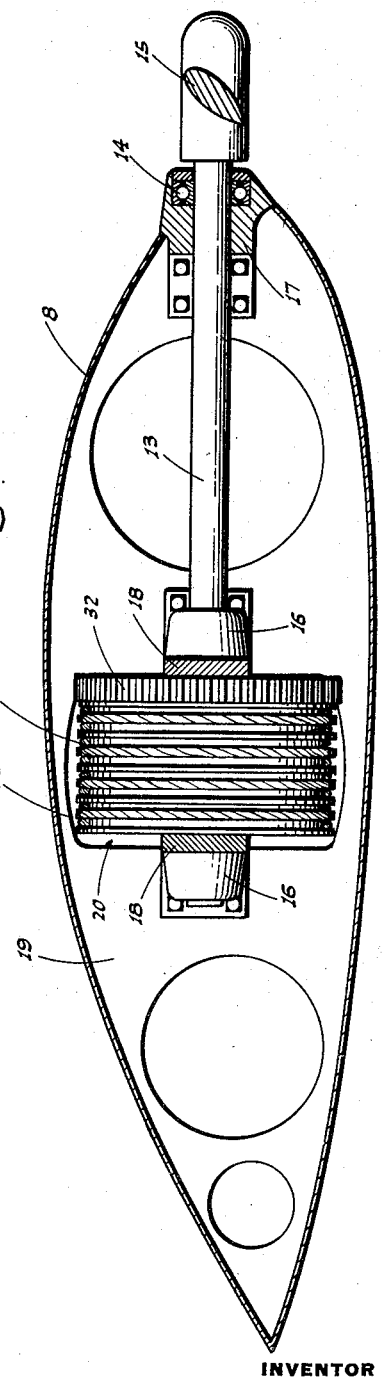
INVENTOR
Emmitt M. Tucker
BY
ATTORNEYS Aug. 25, 1953   E. M. TUCKER   2,649,920
CABLE DRIVE FOR AIRPLANES
Filed Oct. 29, 1951   2 Sheets-Sheet 2

INVENTOR
*Emmitt M. Tucker*
BY *Webster & Webster*
ATTORNEYS

Patented Aug. 25, 1953

2,649,920

UNITED STATES PATENT OFFICE 2,649,920

CABLE DRIVE FOR AIRPLANES

Emmitt M. Tucker, Medford, Oreg., assignor to Tucker & Sons, Grass Valley, Calif., a corporation of California Application October 29, 1951, Serial No. 253,729

8 Claims. (Cl. 170—135.21)

The present invention is directed to, and it is a major object to provide, a novel power transmitting mechanism, especially designed but not limited for use on an airplane to drive outboard or wing-mounted propellers from an engine supported in the fuselage.

Another important object of this invention is to provide a power transmitting mechanism, as above, which embodies a novel endless cable and pulley assembly.

A further object of the invention is to provide a power transmitting mechanism, as in the preceding paragraph, wherein such endless cable and pulley assembly is arranged to transmit the power from the fuselage-supported engine to the outboard propellers smoothly, positively, and with a minimum of power loss by slippage or friction.

An additional object of the invention is to provide a power transmitting mechanism, as described, which substantially reduces the weight load on the airplane wings.

It is also an object of the invention to provide a power transmitting mechanism which is simple in structure but long-lived, and requiring a minimum of service or repair; the mechanism being designed for ease and economy of manufacture and installation.

Still another object of the invention is to provide a practical and effective power transmitting mechanism, and one which will be exceedingly effective for the purpose for which it is designed.

These objects are accomplished by means of such structure and relative arrangement of parts as will fully appear by a perusal of the following specification and claims.

In the drawings:

Fig. 1 is a somewhat diagrammatic perspective view of a rotary wing aircraft having outboard propellers driven by the power transmitting mechanism which is the subject of this invention.

Fig. 2 is a somewhat diagrammatic plan view of the power transmitting mechanism.

Fig. 3 is an enlarged diagrammatic elevation of said mechanism.

Fig. 4 is an enlarged fragmentary elevation of the inboard pulley unit showing its connection with the main drive shaft and central section of the wing.

Fig. 5 is an enlarged transverse section on line 5—5 of Fig. 2.

Referring now more particularly to the characters of reference on the drawings, the novel power transmitting mechanism, which is the subject of this invention, is here shown as embodied in a rotary wing aircraft which includes a fuselage 1 and a rotary or generally helicopter type wing 2.

The fuselage 1 includes a tail assembly 3 with necessary control surfaces, as shown, and such fuselage is fitted, at the bottom, with landing wheels 4 in tricycle arrangement.

An upstanding main drive shaft 5 is journaled in the fuselage 1, and is driven from within the latter by an engine 6. The main drive shaft 5 projects above the fuselage 1, and the wing 2 is mounted for rotation on such projecting portion of said shaft. The wing 2 includes a central section 7 and alined outer sections 8, being opposed with respect to the angle of incidence, and adjustable from within the aircraft by suitable control means (not shown).

The main drive shaft 5 is journaled, within the central section 7 of the wing, by upper and lower bearings 9 and 10 supported by fixed cage structures 11 and 12, respectively. It will thus be evident that the wing 2 is fixed in connection with the fuselage 1, but may rotate relative thereto.

Adjacent the tips thereof each wing section 8 is fitted therein with a transversely extending propeller shaft 13, each such shaft projecting through a front bearing 14 to a point beyond the leading edge of the related wing section, and ahead of such edge the shaft 13 carries a propeller 15. Within the wing section 8 each propeller shaft 13 is journaled in axially spaced bearings 16.

Each front bearing 14 is supported by a bracket 17, while the bearings 16 are carried on a pulley supporting frame 18. Each bracket 17 and pulley supporting frame 18 is suitably mounted in the corresponding wing section 8, as by attachment to adjacent partitions 19.

Each pulley supporting frame 18 carries an outboard pulley unit, indicated generally at 20, and each such unit includes a drive pulley 21 fixed on the corresponding propeller shaft 13, and an idler pulley 22 on a spindle 23 journaled in the supporting frame 18.

Each idler pulley 22 is disposed inwardly of but immediately adjacent the related drive pulley 21, the axes of said pulleys being parallel.

The central section 7 of the wing encloses an inboard pulley unit, indicated generally at 24. The inboard pulley unit 24 includes a pulley-supporting frame 25 in fixed connection with the cage 11 and consequently fixed in the central section 7 of the wing.

The pulley-supporting frame 25 carries a main drive pulley 26 splined on the drive shaft 5, and idler pulleys 27 and 28 are journaled in said frame on opposite sides of said main drive pulley 26 in immediately adjacent relation and on parallel axes.

The pulleys 21, 22, 26, 27, and 28 are all multiple-grooved in the peripheral face, and an endless, multiple-run cable, indicated generally at 29, is reeved between the inboard pulley unit 24 and the outboard pulley units 20, as will hereinafter appear; the cable 29 being of relatively flexible, multiple-strand, high strength type.

From the inboard pulley unit 24 the multiple-run cable 29 extends outwardly as reaches, indicated at 30 and 31; such reaches, within the inboard pulley unit 24, each traversing a path which extends about one side of the main drive pulley 26 and the opposite side of the related pulley 27 or 28.

From each of the pulleys 27 and 28 the reaches 30 and 31 of the endless multiple-run cable 29 extend longitudinally outward in the corresponding wing section 8, being quarter-turned, and thence reeved through the adjacent outboard pulley unit 20. The reeving is such that each of the reaches 30 and 31 first passes about one side of the related idler pulley 22, then makes a substantially full turn about the adjacent drive pulley 21, and finally returns about the opposite side of said idler pulley 28; thus being generally a "figure 8" reeving.

At adjacent ends the pulleys 21 and 22 of each outboard pulley unit 20 are formed with meshing gears 32. Similarly, the pulleys 26, 27, and 28 of the inboard pulley unit 24 are formed with meshing gears 33.

By virtue of gearing the pulleys together, as above described, positive drive of the pulleys, with a minimum of slippage, is assured. Further, by reason of the direction-changing idler pulleys 22 in the outboard pulley units 20, and idler pulleys 27 and 28 in the inboard pulley unit 24, the endless multiple-run cable is maintained in effective drive contact with the main drive pulley 26 and the drive pulleys 21.

As power is transmitted from the engine 6 through the main drive shaft 5 to the main drive pulley 26, such power thence transmits through the described endless cable and pulley assembly to the propeller shafts 13 and propellers 15.

With drive of the propellers 15, the wing 2 is caused to rotate. Adjustment of the outer wing sections 8, as contemplated, is possible without interference by the power transmitting mechanism, as the cable reaches 30 and 31 permit of such adjustment while continuing to function as intended.

The transmission of power from the main drive shaft to the propellers 15 through the medium of the described power transmitting mechanism is smooth, positive, and with a minimum of power vibration.

While the power transmitting mechanism has been described as embodied in a rotary type wing 2, the invention is adapted—by reason of the flexibility of the cable reaches 30 and 31—to be embodied in an aircraft whose wing structure is convertible from a fixed wing to a rotary wing, as shown—for example—in United States Letters Patent No. 2,511,025.

While this specification sets forth in detail the present and preferred construction of the device still in practice such deviations from such detail may be resorted to as do not form a departure from the spirit of the invention, as set forth in the appended claims.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. Power transmitting mechanism, between a drive shaft and a driven shaft spaced apart a substantial distance, comprising a pulley fixed on each shaft, a parallel-axis idler pulley journaled immediately alongside each shaft-mounted pulley in the direction of the other thereof, all said pulleys being multiple-grooved, and an endless multiple-run cable reeved in generally figure 8 relation about each shaft-mounted pulley and the adjacent idler pulley, with reaches spanning between the said idler pulleys.

2. Power transmitting mechanism, as in claim 1, in which said drive and driven shafts are in parallel planes but are disposed at an angle to each other, said reaches of the endless multiple-run cable having a part-turn imparted thereto in the span thereof.

3. A mechanism, as in claim 1, in which the idler pulleys are geared to the adjacent shaft-mounted pulleys.

4. Power transmitting mechanism, between a drive shaft and separate driven shafts spaced a substantial distance on opposite sides of said drive shaft, comprising a pulley fixed on the drive shaft, parallel-axis idler pulleys journaled immediately alongside the drive shaft-mounted pulley in the direction of the driven shafts, a pulley fixed on each driven shaft, a parallel-axis idler pulley journaled immediately alongside each of said driven shaft-mounted pulleys in the direction of the drive shaft, the axes of the drive shaft and idler pulleys intersecting a line drawn through the axes of the driven shafts, all of said pulleys being multiple-grooved, and an endless multiple-run cable reeved at the ends in generally figure 8 relation about each of said driven shaft-mounted pulleys and the adjacent idler pulley, and said cable having separate reaches reeved intermediate their ends oppositely on the driven shaft-mounted pulley, with each reach thence turning about the opposite sides of the adjacent idler pulleys.

5. Means to drive the transversely spaced shafts of wing-mounted propellers comprising an engine-driven shaft projecting into the wing between the first named shafts, a pulley fixed on each shaft in the wing, parallel-axis idler pulleys journaled in the wing immediately alongside the pulley on the engine driven shaft in the direction of the propeller shafts, a parallel-axis idler pulley journaled immediately alongside each of the propeller shaft-mounted pulleys in the direction of the engine driven shaft, the axes of the engine-driven shaft and the idler pulleys intersecting a line drawn through the axes of the propeller shafts, all of said pulleys being multiple grooved, and an endless multiple-run cable reeved at its ends in generally figure 8 relation about each of the propeller shaft-mounted pulleys and the adjacent idler pulleys, and said cable having separate reaches reeved intermediate their ends oppositely on the pulley on the engine driven shaft, with each reach thence turning about opposite sides of the adjacent idler pulleys.

6. A mechanism, as in claim 5, in which the engine driven shaft and propeller shafts are in parallel planes axially but disposed at an angle to each other; said reaches of the endless multiple-run cable having a part-turn imparted thereto in the span thereof.

7. A mechanism, as in claim 5, in which the idler pulleys are geared to the corresponding adjacent pulleys mounted on the engine driven shaft, and the propeller shaft.

8. Power transmitting mechanism between a drive shaft and a driven shaft spaced apart a substantial distance, comprising a pulley fixed on each shaft, a parallel-axis idler pulley journaled immediately alongside each shaft-mounted pulley in the direction of the other shaft-mounted pulley, the axes of all the pulleys intersecting a common line, and an endless cable reeved in figure 8 relation about each shaft-mounted pulley and the adjacent idler pulley, with reaches spanning between said idler pulleys.

EMMITT M. TUCKER.

References Cited in the file of this patent

UNITED STATES PATENTS

| Number | Name | Date |
| --- | --- | --- |
| 1,132,049 | Waller | Mar. 16, 1915 |
| 1,568,765 | Ortego | Jan. 5, 1926 |
| 1,878,955 | Mantell | Sept. 20, 1932 |

FOREIGN PATENTS

| Number | Country | Date |
| --- | --- | --- |
| 6,149 | Great Britain | of 1912 |
| 8,866 | Great Britain | of 1909 |
| 398,244 | France | Mar. 19, 1909 |
| 11,143 | France | Oct. 26, 1909 |
| | (Addition to No. 400,751) | |
| 545,914 | France | Aug. 4, 1922 |